United States Patent Office.

Samuel Harris
Grain Separator
Springfield Mass
75417
Fig 1
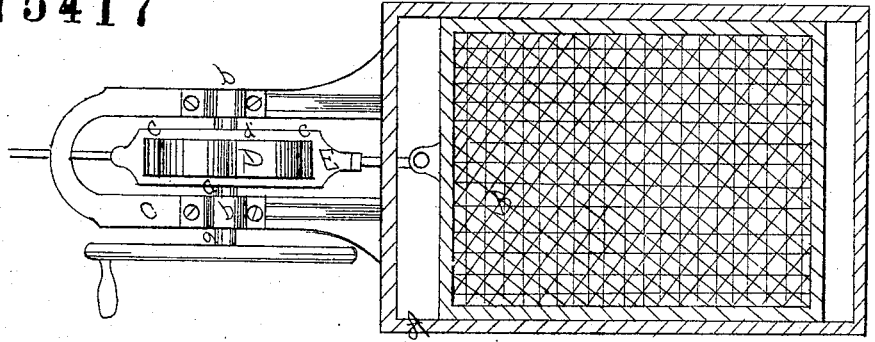
PATENTED
MAR 10 1868
Fig 2
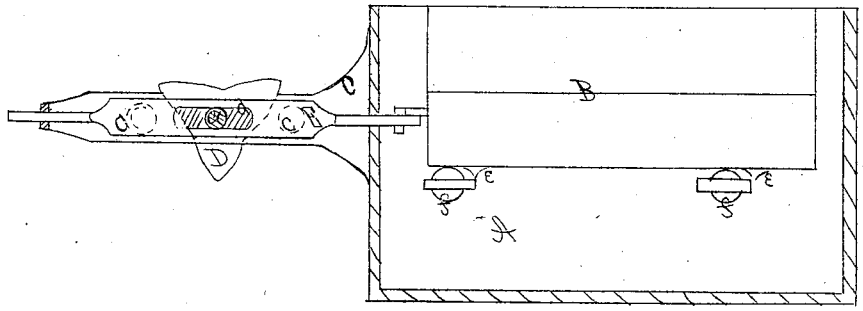
Inventor
Samuel Harris
by atts
Gardiner & Hyde
Witnesses
Chas. F. Cooks
R. F. Hyde

SAMUEL HARRIS, OF SPRINGFIELD, MASSACHUSETTS.

Letters Patent No. 75,417, dated March 10, 1868.

IMPROVEMENT IN GRAIN-SEPARATORS.

The Schedule referred to in these Letters Patent and making part of the same.

TO ALL WHOM IT MAY CONCERN:

Be it known that I, SAMUEL HARRIS, of Springfield, Hampden county, Commonwealth of Massachusetts, have invented certain new and useful Improvements in Grain-Separators; and I do hereby declare that the following is a full and exact description thereof, reference being had to the accompanying drawings and to the letters of reference marked thereon. In the drawings—

Figure 1 is a plan view, and

Figure 2 a side view of my invention.

This invention consists of a sifter, which is vibrated by a triangular surface-cam working upon a rod having rollers arranged so that one complete turn of the cam produces three back-and-forth motions to the sifter to which the rod is connected.

In the drawings, A is the box, having the sifter B inside of it. On the outside of the box A is attached a frame, C, upon which are the bearings of the cam-shaft $a$. The cam D, fastened on this shaft, is turned by means of a crank fastened upon the shaft $a$ also, but outside of the frame C; the cam working in between the two bearings $b$ and $b'$ of the frame C. Attached to the sifter B is a rod, E, by which the motion of the cam is imparted to the sifter. This rod is slotted so as to take in the cam, and has a roller, $c$, at each end of the slot. The distance between these rollers is the same as that between the end of one of the triangular points of the cam and the inner opposite indentation. And the cam being formed upon the outside in such a manner that the sum of the radii, on each side of the horizontal line through the centre, is always the exact distance between the rollers, there is no lost motion, and the rod having the rollers is vibrated back and forth three times to every revolution of the cam. There are slots $d\ d'$ in the sides of this rod, where the cam-shaft passes through, so as to allow the latter to occupy a central position, and without preventing the motion of the rod. An agitator is formed for the sifter by means of curved projections on the underneath side of the sifter-frame. These projections $e\ e$, &c., are placed in the line of the rollers $f f f$, &c., upon which the sifter-frame is vibrated horizontally, so that when the pieces $e\ e$, coming either way, strike against the rollers $ff$, the sifter-frame is thrown up, and, when vibrated rapidly, is kept in a constant state of agitation.

The advantages of this machine are, the rapidity of motion obtained by the triangular cam, and the complete agitation given to the sifter.

Having described my invention, what I claim as new, and desire to secure by Letters Patent, is—

1. The combination of the slotted rod E, having rollers $c$, with the triangular surface-cam D, when used and arranged upon a sifter, substantially as herein described.

2. In combination with the above, the double-inclined agitators $e\ e$, &c., arranged as described.

SAM'L HARRIS.

Witnesses:
 EDWARD H. HYDE,
 CHAS. T. WORK.